United States Patent
Prins

[11] Patent Number: 6,068,216
[45] Date of Patent: May 30, 2000

[54] DEVICE FOR TREATING THE EXTERIOR OF AN AIRCRAFT

[75] Inventor: Willem Frederik Prins, Zandvoort, Netherlands

[73] Assignee: Maatschappij Voor Beheer en Innovative Prins B.V., Zandvoort, Netherlands

[21] Appl. No.: 09/237,388

[22] Filed: Jan. 26, 1999

Related U.S. Application Data

[63] Continuation of application No. PCT/NL97/00450, Jul. 31, 1997.

[51] Int. Cl.[7] .................................................. B64D 15/10
[52] U.S. Cl. ................................ 244/134 R; 244/134 C
[58] Field of Search ............................... 244/1 R, 134 R, 244/134 A, 134 B, 134 C

[56] References Cited

U.S. PATENT DOCUMENTS

| | | | |
|---|---|---|---|
| 3,533,395 | 10/1970 | Yaste | 126/271.1 |
| 3,612,075 | 10/1971 | Cook | 134/99 |
| 5,104,068 | 4/1992 | Krilla et al. | 244/134 R |
| 5,454,533 | 10/1995 | Grant et al. | 244/134 R |

FOREIGN PATENT DOCUMENTS 0 390 296 A1  2/1990  European Pat. Off. .

*Primary Examiner*—Robert P. Swiatek
*Attorney, Agent, or Firm*—Hoffman & Baron, LLP

[57] ABSTRACT

A device for treating the exterior of an aircraft, more particularly the wing and tail surfaces of an aircraft, comprising two gantries disposed on either side of a parking guide line on an aircraft parking place. The gantries are placed to be moved towards one another in a direction transversely to said parking guide line, from a position in which the gantries are mutually spread corresponding to the wing span of an aircraft. Said gantries are each provided with an elongate support beam that extends substantially parallel to said parking guide line and is provided with means for dispensing a treatment fluid, which means is formed by at least one spraying tube extending longitudinally of the respective beam, said spraying tube is equipped with longitudinally spaced spraying nozzles that cooperate with independently controllable valves.

9 Claims, 2 Drawing Sheets

6,068,216

1

DEVICE FOR TREATING THE EXTERIOR OF AN AIRCRAFT

CROSS-REFERENCE TO RELATED APPLICATIONS

This is a continuing application of PCT/NL97/00450 filed on Jul. 31, 1997.

FIELD OF THE INVENTION

The present invention relates to a device for treating the exterior of an aircraft, comprising two gantries disposed on either side of a parking guide line on an aircraft parking place and movable towards one another in a direction transversely to said parking guide line from a position in which the gantries are mutually spread corresponding to the wing span of an aircraft, said carriages being each provided with an elongate support that extends substantially parallel to said parking guide line and is provided with means for dispensing a treatment fluid.

BACKGROUND OF THE INVENTION

Dutch patent application 8900803 discloses a device for treating the outer side of aircrafts, which is more particularly designed for cleaning the wings, the body and the tail portion of an aircraft. With this well-known device means for dispensing a treatment liquid—in this case a washing liquid—are formed by brushes to be supplied with the washing liquid, which brushes are mounted for movement along the longitudinal support of each gantry and for adjustment in the vertical direction.

A problem with respect to the surface treatment of aircrafts, for which no satisfactory solution was found as yet, concerns the de-icing and anti-icing treatment of large portions of the aircraft, including movable parts, such as the flaps, as well as the stabilo and the tail portion of the aircraft.

Such a de-icing treatment has to be carried out—in freezing weather—immediately preceding the take-off of the aircraft.

The usual procedure comprises the use of a truck of the tower waggon type, provided with a tank containing glycol, a pump and a spraying lance, said vehicle being driven to the aircraft so as to carry out the de-icing treatment, after which the aircraft can ride to the runway.

In practice a number of such trucks is used for service at changing locations spread over the platform area of the airport. There is a growing opposition against this procedure due to the inherent environmental contamination which goes far beyond allowable limits and is caused by the de-icing liquid that drips off the surfaces treated by the spraying lance and is often used in excess.

Moreover, the well-known trucks can only carry a limited amount of treating liquid, so that frequent and time consuming replenishing of the liquid supply is necessary.

SUMMARY OF THE INVENTION

The invention aims at improving a device of the type defined hereinabove and making it suitable for de-icing aircrafts in a manner that saves the environment to a considerable extent and requires a much shorter time for treatment.

According to the invention this aim is achieved in that the means for dispensing treatment fluid is formed by at least one spraying tube extending longitudinally of the longitudinal support, said tube being equipped with longitudinally spaced spraying nozzles, that cooperate with independently controllable valves.

The device according to the invention is particularly useful for placement at the taxi route towards the runway. During a short period of standstill of the aircraft the two carriages are moved from a spaced position transversely towards the aircraft while quickly and effectively spraying the aircraft with de-icing liquid, at the front side across the wings and at the rear side across the stabilo and the tail planes.

The valves cooperating with the individual (groups of) spraying nozzles can be simply controlled in such a manner, that each time only that (group of) spraying nozzles of the spraying tube is opened, that is actually located above the surface to be de-iced, a certain minimum reference marging being considered at the front and rear edges of the surface to be treated, if desired.

In particular computer-controlled valves may be envisaged, making use of a control program that is representative of the type of aircraft to be treated.

The manner of de-icing by means of a spraying tube with controlled valves is, as such, a considerable improvement as compared with the de-icing procedure through a spraying lance, in the sense, that the de-icing liquid can be better and more effectively metered, whereas the required total amount of de-icing liquid and thus also the amount of liquid running into the environment can be substantially reduced.

Due to the fixed site of the device according to the invention it will be easy to take measures for collecting draining and dripping liquid and thereby reduce environmental contamination to a minimum.

As the device may be continuously supplied from a stationary storage tank containing de-icing liquid through a flexible hose connection, the time consuming back and forth travelling of the well-known de-icing trucks with the inherent danger for traffic congestion no longer exists. The aircrafts can be treated quicker one after the other.

The period of time during which the aircraft is stationary is utilized for the greater part as effective spraying time.

By placing the device at the entrance route towards a runway which allows the de-icing treatment to be postponed until shortly before take-off, the risk is avoided, that the liquid has become already rather inactive before the take-off is actually taking place. The latter frequently occurs in case of the usual procedure above referred to, especially on the bigger airports.

It is to be noted that document U.S. Pat. No. 5,104,068 discloses an apparatus which is designed for de-icing and anti icing of an aircraft. The apparatus comprises a set of two spraying tubes directed at right angles to the longitudinal axes of the aircraft to be treated and extending cantilever-like from fixed posts on either side of the aircraft to be treated. The de-icing or anti-icing treatment is carried out while the aircraft is towed between the posts and under the spraying tubes.

Further features of the invention will be hereinafter further explained by way of example with reference to the drawing.

DESCRIPTION OF A PREFERRED EMBODIMENT

Figure 1:
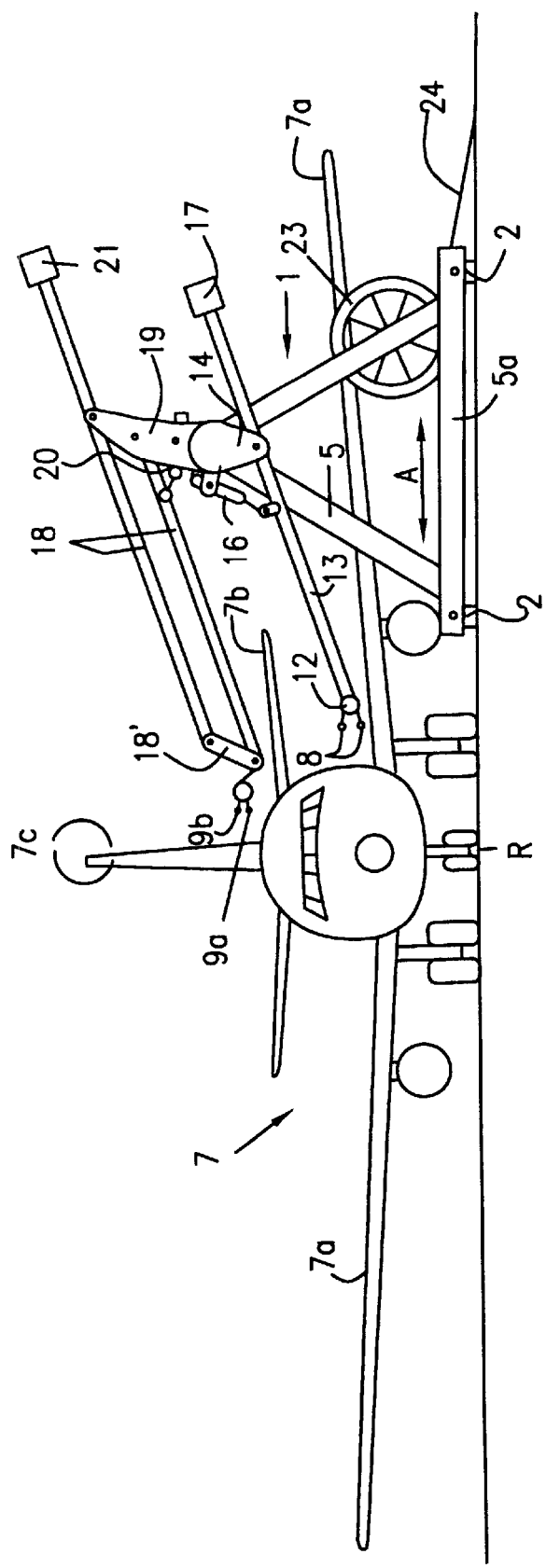
FIG. 1 is a diagrammatic front view of one of the two gantries of the device according to the invention, showing the gantry in its innermost position relative to the larboard side of the body of an aircraft to be treated

The device according to the invention comprises two carriages in the form of gantries 1 with wheels 2, disposed on either side of a parking guide line R, one of which gantries being shown in the drawing. These gantries each comprise two frames 5 supported on wheels 2 and a longitudinal beam 4 extending over the same. The longitudinal beam 4 projects with its ends through a certain distance beyond the frames 5 and in the example shown in the drawing it is at a fixed level over that of the wing surfaces to be treated.

Figure 2:
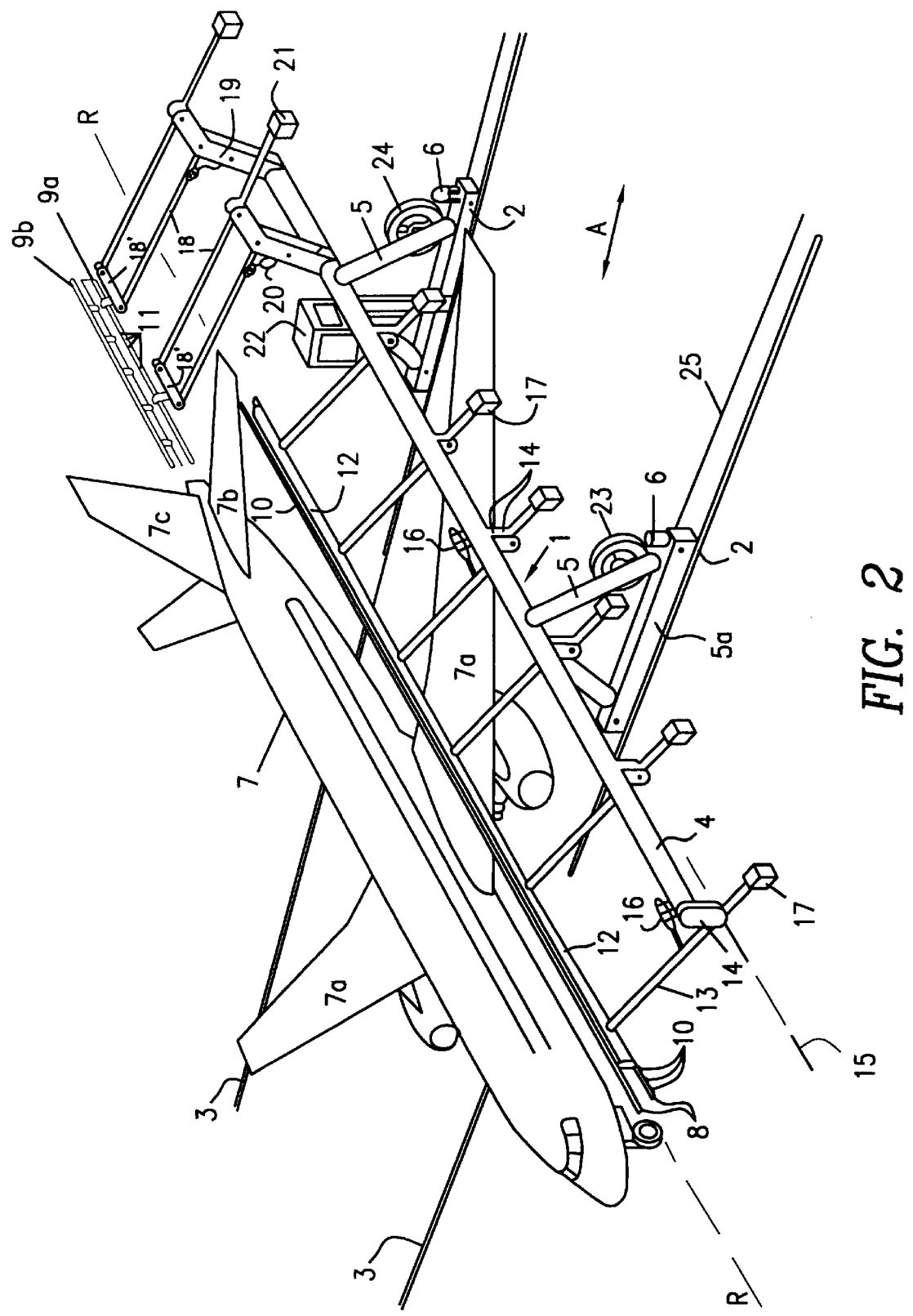
FIG. 2 is a perspective view, in which also only one of the two gantries, namely that on the larboard side of the aircraft to be treated, is shown.

On the base portions 5a of the frames 5 of each gantry 1 drive motors 6 are provided for moving the respective gantry in the arrow direction A (see FIG. 2).

Guide rails 3 may be provided for the wheels 2 on an area of an airport platform that is adapted for stationing an aircraft to be de-iced thereon. The drawings show such an aircraft 7, which has been maneuvered, e.g. with the aid of signs such as route lines provided on the ground, into the right position (according to parking guide line R) for a treatment.

The two gantries 1 can be spaced apart over the rails 3 to an extent that allows the aircraft with its wings to pass between the opposite gantries (FIG. 1). In the deicing position the two gantries 1 are positioned (substantially) symmetrically relative to the parking guide line (R).

The tools for the de-icing are formed by two types of spraying tubes which are adapted, in principle, for treating the wings and the tail portion respectively.

The spraying tubes for the wings are indicated at 8, while those for the tail portion are designated at 9a and 9b.

The spraying tubes 8 and 9 are provided with a series of spraying nozzles 10 and 11 respectively, which are spaced along the respective spraying tubes and cooperate with valves (not shown), e.g. solenoid valves, which are controllable (in groups, if desired) independently from one another.

In the example shown in the drawing each gantry is provided with two spraying tubes 8 for treatment of the wings, the spraying nozzles 10 of said spraying tubes having slightly differing spraying directions.

The two spraying tubes 8 are connected, through a support tube 12, to the free ends of a plurality of support arms 13, which extend in planes at right angles to the longitudinal direction of the longitudinal beam 4 and are mounted to said longitudinal beam, between lugs 14, for a pivoting movement in said planes about a common horizontal axis 15. The elevation angle of the support arms 13 and thereby the height of the spraying tubes 8 above ground level is adjustable or controllable by means of a number of piston cylinder devices, e.g. hydraulic cylinders 16, which are connected to the respective support arms on one hand and to the longitudinal beam 4 on the other hand. At the ends of the support arms 13 that are turned away from the spraying tubes 8, counterweights 17 are provided to reduce the load that is applied to the hydraulic cylinders 16.

The two support arms 18 carrying the spraying tubes 9a and 9b for the tail portion of the aircraft are in the form of a parallelogram linkage system, the two fixed pivots of which are provided on a support arm 19 that extends from the longitudinal beam 4 upwardly. The spraying tubes 9a and 9b are fixedly connected to the links 18' of said parallelogram linkage system which are located at the free ends of the two support arms 18 so that the spraying tubes 9a, b will not rotate about the respective axes when the support arms 18 are moving upwards or downwards and consequently the spraying direction of the respective spraying nozzles 11 will not change. The latter is important, because the support arms 18 have to make a rather large stroke for treating both the horizontal and vertical surfaces of the tail portion of the aircraft. In the example shown in the drawing there are two tubes 9a and 9b, which are each provided with a series of longitudinally spaced spraying nozzles. The lower one 9a of these spraying tubes, by means of which the horizontal surfaces have to be de-iced, has the spraying direction of the spraying nozzles substantially vertically downwards, whereas the spraying direction of the spraying nozzles of the upper spraying tube, serving for the treatment of the vertical surfaces, is substantially horizontally turned away from the respective gantry 1.

The elevation angle of the two support arms 18 and thereby the height of the spraying tubes 9a and 9b above ground level is adjustable and controllable by means of hydraulic cylinders indicated at 20. To reduce the load on these cylinders both of the support arms 18 are provided with a counterweight 21 provided on an extension of the upper link of the respective parallelogram linkage system.

The steering of the two gantries may occur from a cabin 22 mounted on the longitudinal beam 4.

The required energy may e.g. be supplied by means of a cable 25, which can be wound on and unwound from a reel 23 mounted on one of the side frames 5.

As an example of the manner of supplying the required de-icing liquid a reel 24 is provided on the other side frame 5 for winding and unwinding a supply hose for the treating liquid. The connection between the reel 24 and the spraying tubes 8 and 9a and 9b has not been shown.

The operation of the above described device is as follows.

After the aircraft 7 to be treated has come to a standstill between the sufficiently spread gantries 1 the device is put into operation to cause the gantries 1 to move towards one another in the arrow direction A. At first the gantries 1 are moving with the respective longitudinal beams 4 passing across the wings, while keeping the (lower ones of the) spraying tubes 8 at the required level above the upper wing surface 7a, e.g. through sensors (not shown) provided on the support tube 12 which control the hydraulic cylinders 16.

It will be understood that the inward movement of a gantry brings a varying series of spraying nozzles 10 of the spraying tube 8 straight above the wing surface 7a. As mentioned before, a computer aided control, making use of a program that contains data relating to both the shape and the dimensions of the wing to be treated, enables to achieve in a simple manner, that each time only those spraying nozzles 10 are opened by the respective (solenoid) valves for delivering de-icing liquid, which are actually positioned directly above the wing surface to be treated.

As soon as the treatment of the wings has progressed to the extent that the lower spraying tubes 9a for the tail portion has reached the lying tail surfaces 7b, the control of the spraying nozzles 11 of the spraying tube 9a is started in a manner which is similar to what has been described above with respect to the wing surfaces 7a. The spraying tubes 9a are kept at a suitable level above the lying tail surface 7b to be treated, e.g. through sensors which control the hydraulic cylinders 20.

At the completion of the treatment of the wing surfaces 7a and the lying tail surfaces 7b the gantries 1 are brought to a standstill and the support arms 18 are swung upwardly by the 10 hydraulic cylinders 20 for treating the vertical tail surfaces 7c of the aircraft. The treatment of the vertical tail surfaces 7c is effected by the spraying nozzles of the upper spraying tube 9b. These spraying nozzles are also controlled in such a way that each time only those spraying nozzles are opened by the respective valves, which are positioned directly opposite the respective vertical tail surface 7c. After the vertical tail surfaces 7c having also been treated the gantries 1 return, automatically if desired, to the spread starting position which allows the aircraft to drive off towards the runway. Based on calculations, the de-icing process can be carried out within 60 sec., starting from the moment, that the aircraft has come to a standstill, until the moment, that the treated aircraft is allowed to drive off.

The device shown in the drawing is particularly suitable for treating so-called "narrow bodies", with which in professional circles all those aircraft are meant, which in the passenger transportation version comprise no more than two rows of passenger's seats. Aircraft of the "narrow body" type, which account for roughly 80% of the world's air traffic, have in common that there is little difference in height of the wings in the parked position. The differences mainly relate to the wing-span and to the body length, the latter manifesting itself in difference in spacing between the base of the wing at the body and the tail portion. These differences however may be easily covered by the above device. For this purpose, more particularly, the spraying tubes 8 adapted to treat the wing surfaces, have an adequate length.

As shown in the FIG. 2, the supporting tube 12 provided with the spraying tubes 8 extends substantially from the cockpit end until the beginning of the tail portion.

The device shown in the drawing has the advantage, that it also enables the body to be treated therewith, and more particularly as a pre-treatment (called "anti-icing"), which is usually carried out during night time.

Finally it should be remarked, that especially the spray tube assembly serving for the treatment of the tail portion enables to effectively treat additional tail surfaces, if any, that are at a higher level than the surfaces 7b.

What is claimed is:

1. A device for treating the exterior of an aircraft comprising a pair of gantries disposed on either side of an aircraft parking guide line on an aircraft parking place, said gantries having each an elongate support beam positioned above aircraft wing level and extending substantially parallel to said parking guide line, and said gantries being placed to be independently moved, from a spread starting position in which the gantries are spread apart to an extent corresponding to the wing span of an aircraft, towards one another in a direction transversely to said parking guide line and with said support beams passing over the wings of an aircraft to be treated, said support beams carrying means for dispensing treatment fluid, wherein said treatment fluid dispensing means is constituted by at least one spraying tube, that extends longitudinally of the respective elongated support beams, said tube being provided with longitudinally spaced spraying nozzles, which cooperate with independently controllable valves.

2. A device according to claim 1, wherein separate spraying tubes are provided for the wings and for the tail portion of an aircraft to be treated.

3. A device according to claim 1, wherein said spraying tubes are connected to the free ends of supporting arms, which extend from the elongate support beams inwardly and transversely to said parking guide line.

4. A device according to claim 3, wherein said support arms are pivotally and adjustably connected about longitudinal axes to said support beams.

5. A device according to claim 4, wherein the pivot axes of said supporting arms for the spraying tubes for the aircraft tail portion are positioned at a distance above the respective support beam, whereas the supporting arms for the spraying tubes for the aircraft wings are positioned at a certain distance under said support beam.

6. A device according to claim 4, wherein the height of the spraying tubes is adjustable by means of inclination-adjusting devices, such as piston cylinder devices, which connect to the respective supporting arms and to the support beam respectively.

7. A device according to claim 6, wherein the arms are provided with counterweights.

8. A device according to claim 3, wherein at least the supporting arms for the spraying tubes for the aircraft tail portion are in the form of a parallelogram linkage system, of which the links positioned at the free arm ends are carrying the spraying tubes.

9. A device according to claim 8, wherein the spraying tubes for the aircraft tail portion comprise two series of spraying nozzles, the spraying directions of which are turned substantially downwardly and horizontally respectively.

* * * * *